United States Patent [19]

Tyree

[11] 4,007,540
[45] Feb. 15, 1977

[54] METHOD FOR FABRICATING A CAVITY RIVET ASSEMBLY

[75] Inventor: Gerald W. Tyree, Canoga Park, Calif.

[73] Assignee: Lockheed Aircraft Corporation, Burbank, Calif.

[22] Filed: Mar. 3, 1975

[21] Appl. No.: 555,074

Related U.S. Application Data

[62] Division of Ser. No. 399,311, Sept. 21, 1973, abandoned.

[52] U.S. Cl. .................................. 29/509; 29/522; 85/37; 85/70
[51] Int. Cl.² .................. B21D 39/00; B23P 11/00
[58] Field of Search ............... 29/509, 522; 85/37, 85/70; 52/758 D

[56] References Cited

UNITED STATES PATENTS

| | | | |
|---|---|---|---|
| 2,047,341 | 7/1936 | Vaughn et al. | 29/509 |
| 2,302,501 | 11/1942 | Mears | 29/522 UX |
| 2,511,920 | 6/1950 | Keller et al. | 29/509 |
| 2,571,290 | 10/1951 | Quigley | 29/509 UX |
| 3,526,032 | 9/1970 | Pipher | 29/509 |
| 3,561,102 | 2/1971 | Diemer | 29/509 |

*Primary Examiner*—Charlie T. Moon
*Attorney, Agent, or Firm*—Billy G. Corber; Lowell G. Turner

[57] ABSTRACT

An assemblage of a rivet for securing at least a pair of sheets or other members, wherein the rivet is formed with a cavity in its upset end of predetermined dimensions with respect to the sheets and the remainder of the rivet. The cavity preferably terminates in the thickness of the bottom sheet, thus facilitating rivet upset while providing maximum strength.

2 Claims, 6 Drawing Figures

METHOD FOR FABRICATING A CAVITY RIVET ASSEMBLY

This is a division of application Ser. No. 399,311, filed Sep. 21, 1973, now abandoned.

BACKGROUND AND SUMMARY OF THE INVENTION

This invention pertains to the art of rivets, and particularly to aircraft rivets. By way of background, in order to better understand the invention, in the early days of metal aircraft, aluminum sheets and other parts were riveted together with aluminum rivets made of relatively ductile alloys of aluminum. This arrangement operated very well for many years so long as the rivets had adequate shear strength to develop a balance between shear of the rivet and bearing strength of the parts being fastened.

As demands on aircraft increased stronger alloys of aluminum were used for the sheets, but it was not possible to increase the allowable shear strength of the rivets. Rivets made of these stronger aluminum alloys could not be driven properly; i.e., the rivets often cracked in attempting to expand sufficiently for the desired upset diameter and to properly fill the hole. Relatively larger rivets were required in order to develop the strength of the newer aluminum alloys, and such larger rivets require greater edge distances and wider mounting flanges, thereby disadvantageously increasing total aircraft weight.

To solve this fastener problem, the industry first attempted the use of both steel and stronger aluminum alloy rivets which, however, were not designed to be upset in the conventional rivet manner, but rather were designed to have some sort of collar which was often swaged onto the fastener. These designs, sold under various trademarks, did function and were stronger and did have the necessary strength compared to upsettable aluminum rivets, but they suffered from the severe disadvantages that they were substantially heavier and substantially more costly than true rivets. These fasteners were most often installed in clearance type holes, and thus did not expand and did not fill the hole. The disadvantages of space between fastener and hole was not even recognized as a potential problem at that state of the art, as it is today and as is wellknown to those skilled in riveting.

Next came interference type fasteners of various grades of steel or titanium. A closely allied development was a mating taper between the hole and the shank of the fastener. These fasteners, both tapered and plain, were forced into their holes to solve the previous problems of lack of hole fill. These fasteners, again sold under various different trademarks, depend upon a threaded end and a mating threaded part to close up on the work. Such systems suffer from the disadvantages that they require holes drilled to close tolerances and are very intolerant of any out-of-roundness. The invention, on the other hand, can even tolerate a slightly oblong hole. These threaded type fasteners were heavier yet and even more expensive than the swaged collar types, but they did solve the problem of hole fill.

Then the aircraft industry went to large scale use of titanium in the airframe and titanium rivets which were otherwise similar to solid aluminum rivets. Titanium has sufficient shear strength for aircraft, and since the result was a hard metal rivet in hard metal structure, the resulting assemblages were satisfactory; the strength of the threaded types and the swaged collar types of fasteners was at least equaled at this stage. However, there are problems in the use of solid titanium rivets, which are overcome by invention cavity rivets made of the same titanium alloys. First of all, it is difficult to upset such a solid rivet, and large riveting guns or squeezers are required. Such large tools in turn produce the disadvantages of increased possibilities of damaging adjoining structure, worker fatigue to the point of excluding female riveters (a common practice in the aircraft industry), and producing generally slower, more expensive work. Another problem is that such solid titanium rivets could not be used in aluminum structure in that they would deform the aluminum upon being driven and expanded. This sheet deformation and corresponding internal stress problem using solid titanium rivets in aluminum structure is so great that it is simply not done.

Various modified or compromise approaches have been developed and are currently marketed. The previous logic has simply been reapplied to a titanium rivet; i.e., various kinds of collars or washers are provided around the rivet on the back sheet side to prevent excessive rivet expansion. These systems suffer from new problems including the fact that they require special tools; i.e., they preclude the use of the extensively developed art of conventional riveting thereby wasting that enormous pool of well developed tools and skills. Such systems suffer from a corresponding excessive high price.

Another approach is the bi-metallic rivet. This fastener has a tip, usually welded to the main titanium shank, formed of a more easily upsettable material, such as a relatively soft titanium alloy, a nickel-cobalt alloy, or the like. Bi-metal rivets suffer from a number of disadvantages which are overcome by the invention. The dissimilar metals can cause a hydrogen build-up at the weld interface which can cause the rivet to fail. Many aircraft designers will not risk a failure of the weld joint. The location of the weld joint with respect to the shear plane between the sheets is not inspectable, thereby resulting in the possibility that the soft metal part of the rivet will be located at the structure shear plane. In the invention cavity rivet, the location of the bottom of the cavity with respect to the outer surface of the bottom sheet is inspectable by insertion of appropriate measuring tools into the cavity after the rivet has been upset. In bi-metal rivets it is impossible to locate the weld joint in a driven rivet.

The term "prior art fasteners" as used herein shall be understood to include all of the above fasteners which are not true rivets. That is, the invention cavity rivet is closely related to ordinary rivets in that it is driveable using present technology and in that it is a one-piece single material device. The above term includes all such fasteners which are not driveable, or which involve at least a two-part structure. In summary, all such prior fasteners, as compared to all driveable rivets including the invention cavity rivet, suffer from many disadvantages, the most important ones of which are their relatively heavier weight, relatively higher initial cost, weld failure potential, and relatively higher cost of installation.

In regard to relative costs, as a rough estimate for the purpose of indicating orders of magnitude rather than for exact comparison, assume that a rivet of a certain size in solid titanium would cost about 10 cents, the same rivet formed with a cavity in accordance with the invention would cost about 12 cents. The special solid titanium rivet with its mating collar would cost about 26 cents. An equivalent plain shank threaded fastener would cost about 40 cents, and a tapered interference type would cost about $1.00 and about $4.00 installed in its special accurate tapered hole. An equivalent bi-metal rivet would cost about 16 cents. The same size (although not structurally equivalent) aluminum rivet with the invention cavity would cost about 2 cents and the same wholly conventional solid aluminum rivet would cost about ¼ of one cent.

A problem will all prior rivets is the possibility of the rivet being overdriven; i.e., excess energy being applied to the rivet in upsetting it. Overdriving can result in the rivet cracking or clinching, or can cause the shank to overswell which can distort the sheets.

An important advantage of the invention resides in its characteristic of change in rate of deflection against upsetting load or force applied. The standard curves are smooth, there are no sharp points of change. The cavity rivet curve, unexpectedly, produces a curve which resembles a step. The second break in the curve occurs at an energy and deflection which produces an acceptable driven rivet and assembled structure, and thereby yields important advantages. Upon reaching this point on the curve, the operator will experience strong resistance to further driving force, and because the curve thereafter rises, even if the operator ignores this "signal", the rivet will tend not to deflect further, and only a concentrated intentional effort to spoil the rivet will produce an unsatisfactory joint. This characteristic is not known to exist in any other kind of rivet.

The invention rivets, as mentioned above, have the important advantage of weight saving over comparable fasteners. Any weight reduction in aircraft is highly desired. Cavity rivets have a weight of 37 percent to 43 percent of the equivalent steel rivets, 30 percent to 60 percent of equivalent prior art fasteners, depending upon size and type, and have slight weight advantage over equivalent bi-metal rivets.

The invention is best applied to a particular installation of a rivet and the sheets or work which the rivet holds together. The length of the cavity in the rivet especially is determined by the thickness and strength of the bottom sheet, i.e., the sheet adjacent the upset end of the rivet. The diameter of the cavity, and the resultant wall thickness defined by the cavity diameter with respect to the rivet diameter, will be determined by various parameters in a particular installation. The various considerations and the teaching of the invention in regard to proportioning of parts in an installation of rivet plus work is more fully set forth below.

A critical parameter in riveting generally and especially in the enviroment of the invention wherein relatively hard metal rivets are used in relatively soft metal work, is rivet expansion. This expansion can be great enough to deform the sheets, which is a serious prior art problem. The formed or cavity end of the invention rivet minimizes this expansion in that it allows a more rapid riveting or formation of the free end upset. This resistance to overswelling at the free end yields the advantage that the assembled sheets are subjected to less deformation. This advantage in turn results in improved fatigue strength. Unfortunately, as is known, there is no agreement among the various companies in the aerospace industry as to standard tests for fatigue, and thus it is not possible to show the advantages of the invention rivet in fatigue on an absolute basis. However, using the standard tests of the Assignee of the present invention, it has been demonstrated that, all other conditions being equivalent, the cavity rivet of the invention has improved fatigue strength over a solid rivet of the same size and material.

The invention cavity rivet controls the flow of material in both the free upset end and the shank inside the work, while at the same time improving the fatigue strength of the assemblage, and permitting faster riveting. In aircraft it is common practice for all rivets to have a tensile strength in the upset end greater than the tensile strength of the head end. Designing for this end result is a consideration in specifying the dimensions of a specific cavity in a specific rivet. However, generally, other considerations, described herein, in typical applications will permit easy achievement of this desideratum.

The invention is not to be confused with tubular rivets which are very old in many non-analogous arts, such as holding pieces of leather or layers of fabric or other soft things together, holding wooden handles on kitchen knives, and the like. A tubular rivet is simply a short length of metal tube which is headed in one way or another. In use, the open tubular end is "clenched" by being struck or otherwise collapsed, or it is frequently simply splayed out, as by having a tool with a conically shaped end forcibly inserted into its open end. The material of the tubular rivet must crack and break in this process, which is acceptable for simple jobs as are mentioned above. In other types of closing methods the open tubular end may be splayed out and then curled inwardly in order to give a neater appearance and to hide the sharp, broken edges. Tubular rivets, even if they were formed of "space-age" materials, would not suffice in aircraft for the dual reasons that there would be insufficient metal and hence insufficient strength at the shear plane, and for the second reason that the tubular end must crack in closing on the work. It is a vital requirement that aircraft rivets have no cracks or other discontinuities in the upset end, or anywhere in the rivet for that matter, because even a microscopically small hairline crack can rapidly propogate itself and cause the rivet to fail under the severe conditions of stress and vibration commonly encountered in aircraft.

Thus, in summary, tubular rivets cannot be used in aircraft and are totally unrelated in concept to the very particularly defined cavity rivet of the invention. A tubular rivet is designed not to have any shaft expansion, thus there is no hole fill. This type of fastener is totally inapplicable where any substantial resistance to fatigue failure is demanded.

BRIEF DESCRIPTION OF THE DRAWINGS

The above and other advantages of the invention will be pointed out or will become evident in the following detailed description and claims, and in the accompanying drawing also forming a part of this disclosure in which;

DESCRIPTION OF THE ILLUSTRATIVE EMBODIMENT

Figure 1:
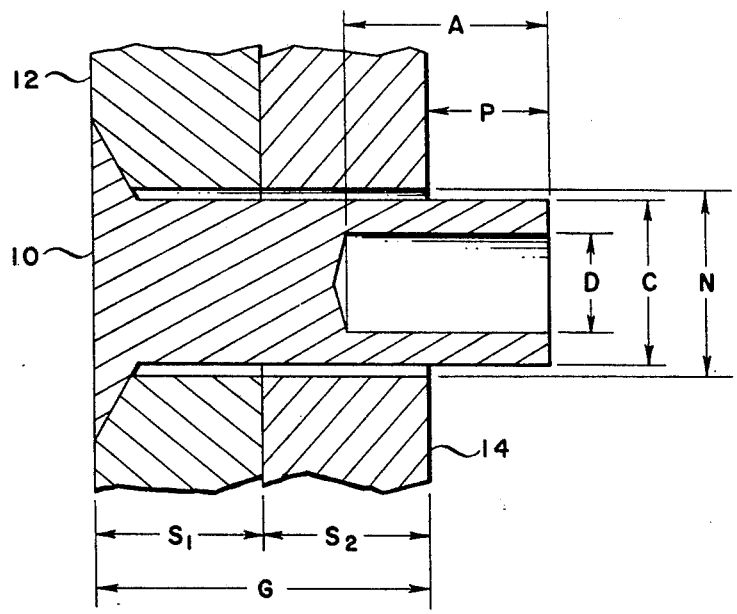
FIG. 1 is a cross-sectional view of a rivet embodying the invention shown in place in prepared openings in a pair of sheets.

Referring now in detail to the drawing, there is shown a rivet 10 embodying the invention which is shown in place in a pair of sheets 12 and 14. The rivet 10 is formed with any conventional head, the conventional preparatory steps of drilling holes and countersinks are performed as required, and these details will not be further described herein. So far as the invention is concerned the head serves to define the maximum insertion position of the rivet which in turn defines some other dimensions, as will appear in more detail below. An important advantage of the invention is that driving is wholly conventional, no special tools, techniques, skills or the like are required. Yet another related advantage is that the invention can be driven by some of the less ordinary tools and techniques such as rivet squeezers, if such are available.

While the invention was developed in the environment of the aircraft industry, it can, of course, be used generally, and particularly where it is desired to use a rivet of relatively hard material to secure a pair of members of relatively softer material. It should be understood that the invention is not limited to securing sheets together, but rather can be used to secure any sort of members to each other. The terms; "at least two," "pair of members," "sheets," "members," "parts," "work" and the like as used herein shall be understood to mean simply any two items (at least) to be secured together. Of course, stacks of three or more such items can be secured, and the invention is not limited in operating upon only a "top sheet and a bottom sheet," which is ordinary aerospace industry jargon.

The contact plane of sheets 12 and 14, or, more generally, the interface between any two members to be secured, shall be called the "shear plane" in the specification and claims hereof, as this is the location at which a shear type of rivet failure can be expected to ocurr. As is well known to those skilled in fasteners, not every contact plane is a "shear plane".

For ease of description, the sheet 12 shall be called the top sheet or head sheet or head member in that it is associated with the head of the rivet 10, and the mating sheet or member shall be called the bottom or free end sheet or member.

The shank or free end of the rivet 10 is formed with a cavity 16, and it is this feature, with respect to and in combination with the natures and dimensions of the other parts which is primarily responsible for producing the advantages of the invention. The cavity 16 can be formed with the use of conventional technologies for titanium or for any other material. Typically, in metals, it may be headed, drilled, impacted, or broached. The cavity 16 was drilled which is the reason for the shallow cone bottom, which cone is thought to have no effect whatsoever on the functioning of the invention.

For the sake of simplifying the following discussion most of the dimensions have been lettered and are defined as follows:

A - Axial length of cavity 16
C - Diameter of the shank of rivet 10
D - Diameter of cavity 16
$S_1$ - Thickness of sheet 12
$S_2$ - Thickness of sheet 14
G - Combined thickness of the sheets being fastened (called "grip" of the rivet)
P - Protrusion of the rivet beyond the sheets N- Hole diameter in sheets before rivet is driven.

Figure 2:
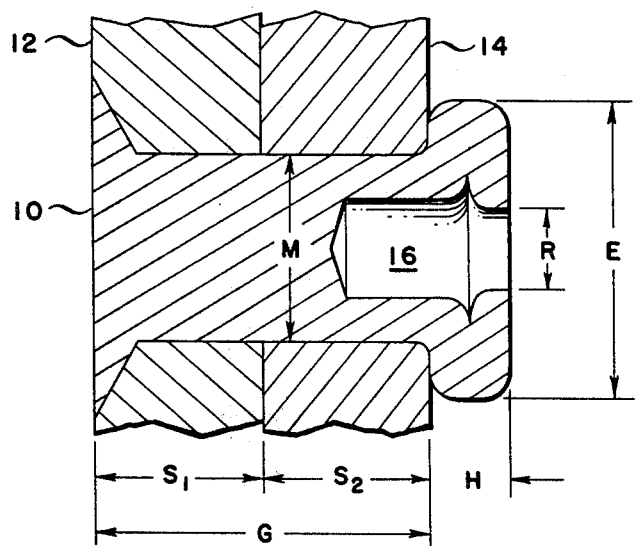
FIG. 2 shows the same installation after the rivet is driven.

The following dimensions appear in FIG. 2 and pertain to the driven rivet:

E - Diameter of the upset on the end of the rivet
R - Diameter of the outer end of the cavity after the rivet is driven
H - Height of the upset
M - Driven rivet shank diameter.

M and N are presented solely to illustrate the most general case. There is no typical situation in the aircraft industry, each company uses its own best thinking. The drawing shows the easier to install and and the easier to illustrate case wherein N is slightly greater than C. It is to be understood that N could be equal to C or actually smaller than C where an interference fit is desired. FIG. 2 shows M larger than N; i.e., where the rivet expands to fill the hole. It is conceivable, although somewhat unusual, to have a FIG. 2 condition wherein M is equal to or smaller than N.

Generally, the bottom sheet will be thick enough that invention rivets having standardized dimensions A will assemble as shown in FIG. 1; i.e., with the cavity terminating in the free end sheet. That is, for any particular grip, even under commercial conditions, it is anticipated that a certain standard size cavity rivet can be used, and the FIG. 1 condition will be fulfilled. In the event of an extremely thin bottom sheet, then it is anticipated that the cavity rivet could still advantageously be used, despite the fact that the cavity might lie in the shear plane, because such an extraordinarily thin sheet would fail in bearing strength before the relatively hard metal rivet would shear even across its cavity portion.

A must be larger than P. This relationship assures that the bottom of the cavity 16 will be located inside the thickness of the sheet S. It is preferred but not required that A be less than $P + S_2$, but, as explained above, the invention can still operate satisfactorily outside that relationship. When dimension A is greater than $P + S_2$, then rivet 10 is not as strong at the shear plane, although it will almost always be strong enough for the particular installation. If, at the other extreme, A were less than P, then the primary advantage of the invention would be lost in that the free end would be partly solid, in which case the upset itself would almost certainly be sheared around its circumference due to the solid column action, or at best, the FIG. 3 prior art situation would result.

The cavity diameter D and the protrusion P are closely related. A longer protrusion yields a longer column which tends to reduce the driving force and to give a larger upset head (H and E). However, a longer P also tends to reduce the amount of shank expansion and to increase the susceptibility to bending of the column causing rivet clinching, cracking, and other problems.

Enlarging the cavity diameter tends to reduce the driving force required and decrease the amount of shank expansion, but increases the susceptibility to rivet clinching. Therefore, the cavity diameter, cavity shape and protrusion are to be determined depending on the amount of shank expansion desired and what type of driving forces are available for upsetting the rivet.

A number of relationships between the dimensioned parts in the drawing can be set forth based upon current requirements and specifications of the aerospace industry. These are not general limitations on the invention, but are only thought to be limitations on its use in aerospace applications.

Upset diameter E is related to diameter C in in that E must be less than 1.6C and more than 1.3C. Similarly, grip G should be less than or equal to four times diameter C.

Cavity length A minus protrusion P must always be a real positive number. It is thought that the minimum depth inside the work should be 0.1C. In aircraft, 0.010 inch has been found to be sufficient for typical cases. In other environments where sheet thickness is not as closely controlled as in aircraft, then a larger minimum A − P will be needed.

P is unrelated to G where there is no desire for shank expansion. Where some shank expansion is sought, then P increases directly as G increases for any particular D. However, D itself, in this respect, decreases as P and G increase.

R must always be smaller than D and greater than zero; i.e., it cannot have a negative size. It is this constraint which differentiates the invention from tubular rivets as used in fabrics, leather, other soft materials, toys, and the like, wherein the tubular end is splayed out, thus resulting in R being larger than D.

It is thought that the annular cross-sectional area of the rivet at its cavity portion can be constant in a specific application. Therefore, simple algebra to define this relationship and changing of constants therein yields the equation:

$C^2 - D^2 =$ a constant (for any size rivet in any specified material at any specified driving force).

Figure 3:
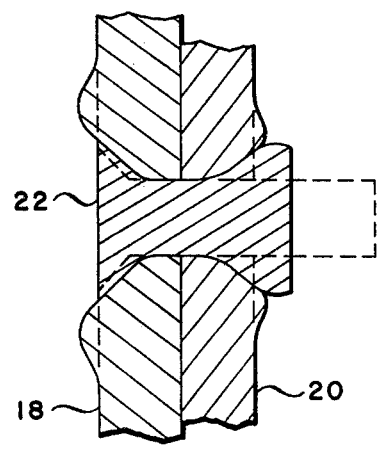
FIG. 3 is an illustrative prior art rivet installation.

Referring now to FIG. 3, there is shown a prior art installation which comprises a top sheet 18, a bottom sheet 20, and a rivet 22. The undriven condition, analogous to FIG. 1, is shown in dotted lines, and the driven condition in solid lines. FIG. 3 represents the highly undesirable condition which obtains when a hard metal rivet, such as titanium, is used in aircraft materials such as the presently commonly used harder aluminum alloys, 7075-T6 and 2024-T-6, for example. The rivet is so much harder than the sheet that the sheet distorts to an extent which renders the riveted structure unacceptable in aircraft, for the reasons set forth above.

Figure 4:
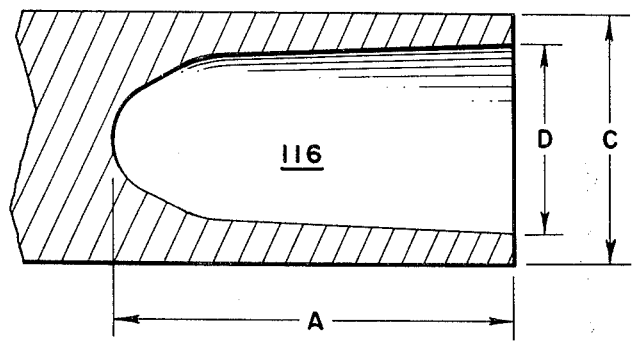
FIG. 4 is an enlarged showing of another cavity configuration.

FIG. 4 illustrates a modified free end of a cavity rivet embodying the invention, having a cavity 116 closely related to cavity 16 of FIG. 1. The FIG. 4 form has not yet been made and tested as has the FIG. 1 form. FIG. 4 is thought to represent the result of conventional impact extrusion methods to produce the invention cavity rivet. The main advantage is speed of production and the elimination of stress risers; i.e., sharp discontinuities in the cavity as formed by drilling or machining.

Examination of FIG. 4 shows that the cavity is defined by a slight angle over most of its length, and by a larger angle at the root, both angles and various other dimensions being exaggerated for the sake of clarity. It is thought that these angles would be in accordance with usual impact extrusion practices, for example, about two degrees for the slight root angle being unimportant.

Figure 5:
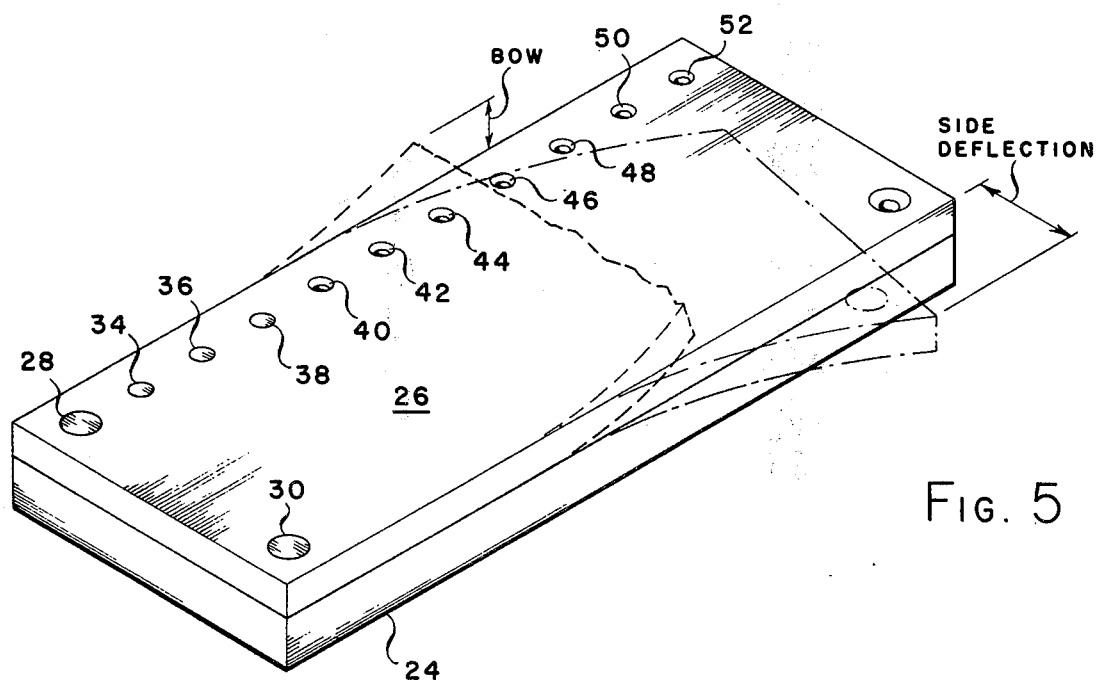
FIG. 5 is a diagramatic representation of a test apparatus which was used to show the advantages of the invention.

FIG. 5 illustrates the test procedure which was used in showing the advantages of the invention cavity rivet with respect to conventional solid aluminum rivets, solid titanium rivets, and bi-metallic rivets.

The underlying concept of FIG. 5 is to compare the various rivets by the amount they distort test sheets comprising a base sheet 24 and a top sheet 26 which is of the same material and approximately half the thickness of the base sheet. This was done so that the test results could be seen very graphically. A hole 28, 30 and 32 was drilled in each of three corners of the two overlying sheets whereby the two sheets were riveted together. Next, 10 holes 34 through 52 for the test rivets were drilled along one edge in line with the hole 28. The rivet in the hole 32 was then removed. The operator then installed test rivets one after another in the holes 34 through 52 starting with hole 34, measuring the two types of deflection after driving each test rivet. The top sheet 26 deflected both in bow upwardly away from the much thicker and stronger bottom sheet 24, and sideways in its own plane across the bottom sheet. The top sheet distorted because a rivet thickens or expands when it is driven, and this expansion causes expansion of the supporting structure. Since the top sheet is much thinner than the bottom sheet, the difference in expansion causes the relative motion between the sheets. Testing stopped whenever the misalignment became so great that the next rivet could not be placed in the next hole, or when the force required to do so exceeded the predetermined design force, and the numbers which follow are the maximum distortion either at the end of the test when all ten rivets were driven, or at the time when the test was stopped.

The tests were all with 3/16 inch size rivets, and with a pair of sheets made of 2024-T3 aluminum having dimensions of approximately 8-1/4 inch long, 1-¼ inch wide, and thicknesses of 0.090 inch and 0.050 inch. The anchor rivets in the holes 28, 30 and 32 were 5/16 inch size.

TABLE I

| Rivet | Side Bending | Bowing |
| --- | --- | --- |
| 2117-T4 | .006 | .022 |
| 2024-T4 | .004 | .029 |
| Bi-Metal | .008 | .026 |
| Titanium, Beta Alloy (Solid) | .040 | .099 |
| Titanium, Beta Alloy (Invention Cavity) | .000 | .012 |

From this table it can be seen that the invention rivet produced the least deflection. It is thought that this occurred because the cavity end reduced the driving force, thus overexpansion and corresponding work distortion was greatly minimized.

A great deal of work has been expended in making prototype rivets to test the invention concept. The following Tables II, III and IV summarize the preferred sizes in inches of rivets which were selected from a much larger number of combinations of the last three columns in the charts. That is, all three charts represent the best selected combinations of specific dimensions based on the criteria of bottom sheet expansion, optimum hole fill, and compliance of dimensions E and H of the upset rivet with industry standards.

TABLE II

| Grip G | Rivet Diameter C .188 inch | | |
|---|---|---|---|
| | Rivet Length G + P | Cavity Dia. D | Cavity Depth A |
| .063 to .094 | .229 | .110 | .170 |
| .095 to .125 | .260 | .110 | .170 |
| .126 to .156 | .298 | .110 | .175 |
| .157 to .188 | .329 | .100 | .175 |
| .187 to .219 | .365 | .100 | .180 |
| .220 to .250 | .400 | .100 | .185 |
| .251 to .281 | .431 | .100 | .185 |
| .282 to .312 | .467 | .100 | .190 |
| .313 to .343 | .498 | .100 | .190 |

The rivets in Table II were made of B120 titanium and were used in aluminum structure. The performance results of these rivets were as good or better than a similar sized solid rivet, keeping in mind that such comparison is artificial in that such a solid rivet would perform unsatisfactorily, for example, as shown in the prior art FIG. 3.

TABLE III

| Grip G | Rivet Diameter C .188 inch | | |
|---|---|---|---|
| | Rivet Length G + P | Cavity Dia. D | Cavity Depth A |
| .063 to .094 | .229 | .110 | .170 |
| .095 to .125 | .260 | .110 | .170 |
| .126 to .156 | .298 | .100 | .175 |
| .157 to .188 | .329 | .100 | .175 |
| .189 to .219 | .365 | .090 | .180 |
| .220 to .250 | .400 | .080 | .185 |
| .251 to .281 | .431 | .075 | .185 |
| .282 to .312 | .467 | .075 | .190 |
| .313 to .343 | .498 | .075 | .190 |

The Table III data was assembled primarily for the purpose of illustrating that a titanium rivet could be used in titanium structure to produce a reduction in driving force and a satisfactory end result. A comparison of Tables II and III shows that in titanium structure, all other conditions being equal, a smaller diameter cavity, dimension D, is required in the longer sizes in order to get the necessary amount of shank expansion.

TABLE IV

| Grip G | Rivet Diameter C .157 inch | | |
|---|---|---|---|
| | Rivet Length G + P | Cavity Dia. D | Cavity Depth A |
| .032 to .062 | .184 | .090 | .165 |
| .063 to .094 | .215 | .090 | .165 |
| .220 to .250 | .372 | .080 | .165 |
| .251 to .281 | .403 | .080 | .165 |
| .313 to .343 | .465 | .070 | .165 |

Table IV shows a smaller rivet diameter, dimension C, this size was not tested as extensively as the 3/16th rivets of Tables II and III and it is the same alloy titanium rivet as in Table II. Table IV illustrates the preferred sizes and dimensions for such rivets for the grips specified.

In the aircraft industry, the most popular rivet sizes are 3/32 inch, ⅛ inch, 5/32 inch and 3/16 inch. For all of these sizes an expansion of 0.003 inch is considered ideal for most applications. In this regard, while FIGS. 1 and 2 show that some shank expansion is anticipated, it is presently thought that the invention could be used with a so-called interference fit between rivet and work because in such case the shank expansion, if any at all, is minimal. The above tests in regard to the two aluminum rivets were run simply to broaden the background to better illustrate the invention, aluminum rivets are still used in many places in aircraft, and it is thought that the invention cavity rivet can be used in an aluminum rivet. Tests were run on various prior art fasteners, but these tests are not shown in that most such fasteners are analogous to nuts and bolts. That is, one does not expect shank expansion from a threaded fastener. The invention's advantages over such devices include all the usual ones of an ordinary rivet over an ordinary threaded fastener.

Figure 6:
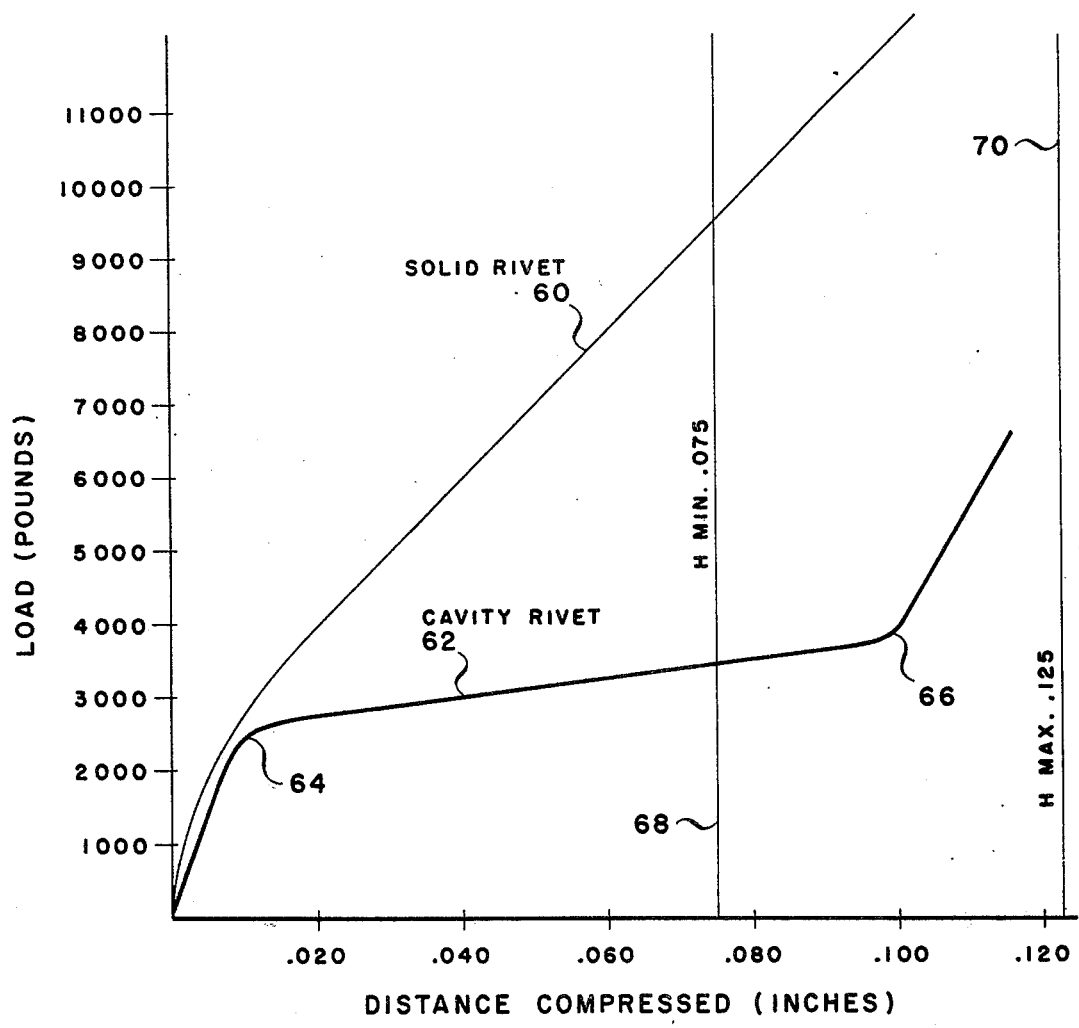
FIG. 6 is a diagram which illustrates the advantageous driving characteristic of the invention rivet.

FIG. 6 used the cavity rivet set forth in Table II above for a grip of 0.126 to 0.156. FIG. 6 illustrates a characteristic of the invention cavity rivet which is completely absent in any prior rivet; i.e., its natural tendency to upset to a proper point and then no further.

The abscissa represents the motion of the anvil in compressing the test rivets, and the ordinate represents the applied load. Curve 60 is representative of this compression curve for solid rivets, it is very typical, but it was not taken from any specific single test. The cavity rivet curve has a step-like structure, having a first inflection point 64, a relatively long relatively horizontal section 62, a second inflection point 66, and a relatively steep increase line completing the curve thereafter. The plateau portion 62 is thought to be caused by the collapsing of the wall around the cavity, which collapse begins at 64 and ends at 66. The vertical lines 68 and 70 are close estimates of standards for rivets in the aerospace industry on the height H of the driven rivet as shown in FIG. 2. These lines could also represent any other arbitrary range. H, of course, has an inverse linear relationship to "distance compressed" measured from some base line. It is highly significant that inflection point 66 falls very neatly at about the middle of the range defined by lines 68 and 70.

The location of inflection point 66 produces very significant advantages for rivets embodying the invention. When the riveter reaches this point, he will experience strong resistance to the application of additional driving force. If the operator ignores this "signal," the rivet will resist further deformation because of the steep rise after point 66. It will thereafter require a purposeful concentrated effort to intentionally mangle the rivet to produce an unsatisfactory joint. Thus, the invention rivet inherently "wants" to upset properly, and then deform no further.

Another significant advantage is that the location of point 66 can be predetermined and designed into a particular rivet. Point 66 will move vertically on the curve in inverse relation to increasing cavity diameter D, and point 66 can be moved left and right, moving rightwardly in direct proportion to increasing protrusion P. In this manner, the highly desirable "automatic" proper upset feature can be "built into" any particular new rivet. Thus, this highly desirable advantage is always obtained in any particular application by selecting appropriate values from some or all of the parameters of the length and diameter of the rivet shank, the materials of the rivet and of the sheets, and the length and diameter of the cavity.

While the invention has been described in detail above, it is to be understood that this detailed description is by way of example only, and the protection granted is to be limited only within the spirit of the invention and the scope of the following claims.

I claim:

1. The method of joining a plurality of parallel, abutting structural members, comprising the steps of:
   forming axially aligned holes through such members;
   inserting through said holes a rivet having a shank with a head on one end and a cavity is an opposite end until said head firmly contacts one of such members, the bottom of said cavity terminating intermediate of the thickness of the structural member nearest the cavity-containing rivet end;
   applying a deforming force to said cavity-containing rivet end so as to deform said rivet in the region intermediate the bottom and the end of said cavity doubling it upon itself and increasing its diameter to a size greater than the diameter of said holes to obtain a firm contact with an external surface of the adjacent structural member, the diameter of said cavity at its end after such deformation being smaller than the diameter of said holes, thereby securing together the structural members.

2. The method of joining a plurality of structural members as set forth in claim 1, wherein:
   said deforming force also causes the rivet portion within the members to expand into intermediate contact with the interior of of said holes, further securing those members.

* * * * *